(12) United States Patent
Jennings et al.

(10) Patent No.: US 6,463,479 B1
(45) Date of Patent: *Oct. 8, 2002

(54) APPARATUS FOR TRUNKING IN STACKED COMMUNICATION DEVICES

(75) Inventors: Kevin Jennings, Rathfarnham; John Hickey, Killernaule; Edele O'Malley, Ashtown, all of (IE); Kam Choi, Tring (GB); Raymond Beechinor, Catsleknock (IE)

(73) Assignee: 3Com Technologies, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 09/201,368

(22) Filed: Nov. 30, 1998

(30) Foreign Application Priority Data

Nov. 28, 1997 (GB) ................................. 9725372

(51) Int. Cl.⁷ ............................................... G06F 13/00
(52) U.S. Cl. ....................................... 709/250; 370/246
(58) Field of Search ............................ 709/223, 250, 709/249, 224, 200, 238, 244; 370/365, 246

(56) References Cited

U.S. PATENT DOCUMENTS

| | | | |
|---|---|---|---|
| 5,327,127 A | | 7/1994 | May et al. ................... 341/102 |
| 5,610,905 A | | 3/1997 | Murthy et al. ............... 370/401 |
| 5,872,781 A | * | 2/1999 | Bennett et al. .............. 370/365 |
| 5,905,873 A | * | 5/1999 | Hartmann et al. ........... 709/249 |
| 5,983,282 A | * | 11/1999 | Yucebay ...................... 709/249 |
| 6,006,275 A | * | 12/1999 | Picazo, Jr. et al. ........... 709/249 |
| 6,108,702 A | * | 8/2000 | Wood .......................... 709/224 |
| 6,175,868 B1 | * | 1/2001 | Lavian et al. ................ 709/223 |
| 6,175,875 B1 | * | 1/2001 | Stapleton et al. ............ 709/250 |

* cited by examiner

Primary Examiner—Zarni Maung
Assistant Examiner—Jungwon Chang
(74) Attorney, Agent, or Firm—McDonnell Boehnen Hulbert & Berghoff

(57) ABSTRACT

Trunking or other relationship is defined between ports on different devices in a cascade connected stack of network devices. When network communications are passed via the cascade connection an indication is included of whether it originated from a port which is part of a trunk and thereby port-mismatch errors can be avoided.

3 Claims, 1 Drawing Sheet

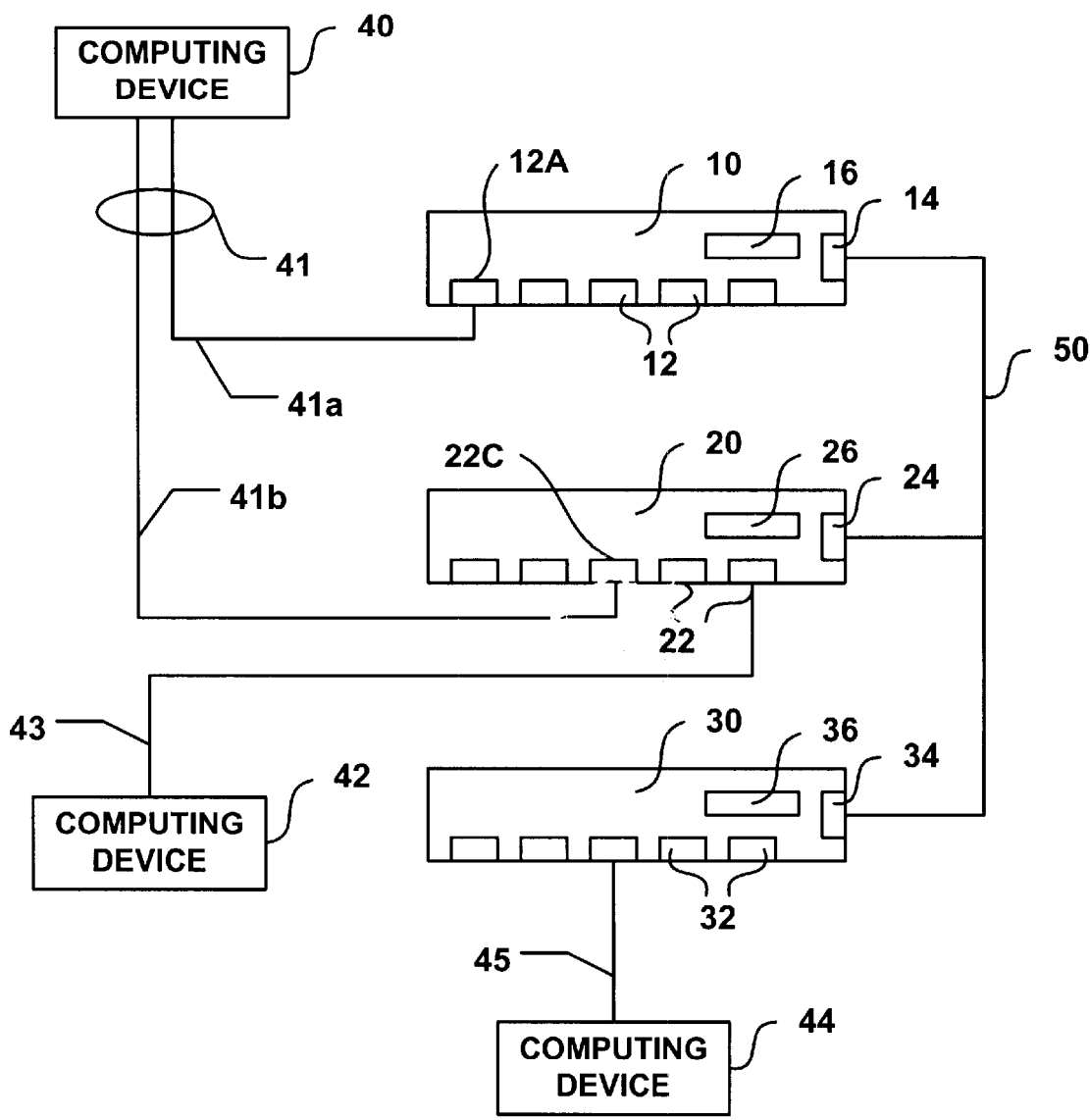
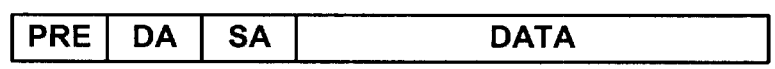
Fig. 2A
Fig. 2B
Fig. 1

APPARATUS FOR TRUNKING IN STACKED COMMUNICATION DEVICES

BACKGROUND OF THE INVENTION

1. Field of the Invention

The present invention relates to computer networks and in particular to communication devices by way of which computers are connected together to form such networks.

2. The Prior Art

It is well known to form computer networks comprising a number of computers connected together to enable them to communicate with each other. One well known way of connecting computers together is to provide communication devices having a plurality of ports, to each of which a computing device may be connected. The communication device provides for redistribution of communications received on its ports to the computing devices connected to the other ports.

One particular type of communications device is a repeater. A repeater simply retransmits any communication received on any port to each of its other ports thereby ensuring that each of the computing devices connected to the network receive all communications, enabling them to decide whether the communication is intended for them or not. Other types of communication devices include devices known as bridges which contain some processing capacity so that packets should only be retransmitted on ports necessary to enable those packets to reach their intended destinations. The present invention is applicable to all these types of communication devices but will be described basically in the context of bridges.

In a practical implementation a bridge is generally contained in an enclosure or box which also carries the external connections or ports to which the computing devices forming the network can be connected. For example there may be eight, sixteen or twenty-four ports provided on the device and the bridge is formed in a known manner on a circuit board also including the necessary management processing power to enable the bridge to function as intended.

More recently it has been recognised as desirable to enable the connection of two or more such devices together to increase the number of ports available at a particular location. This is commonly referred to as connecting the devices in a stack or cascade connection of the devices. Advantages of cascade connection of communication devices include the possibility of upgrading existing equipment to provide a greater number of ports without having to discard the existing equipment, and also the provision of more ports in a particular location than may be available on a standard piece of equipment.

Cascade connection between communication devices is typically achieved by providing a cascade or backbone link between the stacked devices. This connection may be made by way of one or two of the ports already provided on the devices for connection to computing devices in the network, alternatively there may be a separate port especially provided for the cascade link. It will be appreciated that, in the basic operation of a repeater, all communications received on any port by one of the devices in the stack will be repeated to the cascade connection in addition to the other ports thereby enabling it to be received by the other devices in the stack and repeated on out of the other ports on those devices. In a bridge arrangement, a received communication is transmitted via the cascade connection if this is necessary to enable the communication to reach its intended destination.

However, there are other functions which have been provided within a single communications device which present certain difficulties for implementation in a stack. In particular, it has been known to implement a feature known as "Trunking". In trunking a single computing device is connected to a communication device, such as a bridge, using a plurality of connections to a corresponding plurality of ports. The advantage of doing this is that it increases the bandwidth available for communication by the computing device concerned and also there is some resilience in the connection, that is a fault may develop on one of the connections between the computing device and the device but this would not totally disconnect the computing device from the network.

In a simple implementation of a communication device such a dual connection to a communication device would cause port mismatch errors generated when a device receives communications from the same computing device on different ports, which obviously would not occur in the simple implementation of each computer being connected to a single port. The occurrence of such errors can be dealt with within a single device in which the management in the device can associate two or more ports together as a single trunk connection from which it expects communications from a single computing device.

When a stack of communicating devices is provided it may be the case that the two or more connections forming a trunk from a particular computing device may not all be connected to the same physical device in the stack. This may simply be because a user of a network treats the stack of devices as a single entity to which connections can be made freely as in the case of a single device. Further however it is advantageous to be able to connect the different connections forming a trunk to separate physical devices as this provides further resilience in the connection, enabling one of the communication devices to fail without disconnecting the trunked device from the network altogether.

If a trunk is simply connected in this way with the different connections forming the trunk connected to different boxes in the stack each box will potentially receive communications packets from the trunked device both via their own direct connection to that device and via the cascade port. Within the management provided in each box it is not possible simply to define the cascade port as one of the ports included in the trunk because the cascade port will actually carry communications from a large number of different communication devices connected to the stack overall. It is not necessarily the case therefore that all communications appearing on the cascade connection will be part of the trunk, and if the cascade port were simply defined as part of the trunk, port mismatch errors would be generated when communications from other sources were received.

SUMMARY OF THE INVENTION

The present invention provides communications apparatus for a computer network in which a plurality of network devices are enabled to communicate with each other, the apparatus comprising:
- a plurality of communication devices each having a plurality of ports via which network communications may be received and transmitted and a communication core means arranged to re-transmit network communications received at said ports according to a defined functionality; and
- interconnection means arranged to interconnect said communication devices such that network communications received at each communication device may be transmitted to the or each other communication device;

each said communication device comprising management means arranged to transmit, together with each network communication transmitted to said interconnection means, an indication of whether said network communication has been received at a port which has a predetermined relationship with a port in another communication device, and to read said indications received together with network communications received from said interconnection means.

In a preferred embodiment the predetermined relationship is that ports form a trunk and thus the invention enables efficient implementation in a stack of communication devices of trunking which has previously been implemented within a single communications device, as discussed above.

To achieve this, the apparatus and method of the present invention uses a protocol for communications on the cascade connection different from that used in the network as a whole. In particular, communications packets sent via the cascade connection have one or more bits added to them, which extra bits convey information about the packet being transmitted from one communication device in the stack to another. On receipt of a communications packet via the cascade connection, a communication device act on the information provided and will remove the extra bits before retransmission onto the rest of the network to ensure compliance with the overall network protocol.

In the context of trunking as discussed above, the present invention can provide trunking via ports on different boxes within their stack by including with a packet, when it is transmitted on the cascade connection, an indication of which trunk the packet came from, enabling the other communication devices in the stack to take account of this.

BRIEF DESCRIPTION OF THE DRAWINGS

Other features and advantages of the present invention will be understood from the following description of an exemplary embodiment which is given in conjunction with the accompanying figure, in which FIG. 1 is a schematic illustration of an embodiment of the present invention; and FIG. 2 illustrates the construction of a data packet in the preferred embodiment of the invention.

DETAILED DESCRIPTION OF THE DRAWINGS

In this invention, trunking or other relationship is defined between ports on different devices in a cascade connected stack of network devices. When network communications are passed via the cascade connection an indication is included of whether it originated from a port which is part of a trunk and thereby port-mismatch errors can be avoided.

FIG. 1 illustrates, in schematic form, a simplified computer network useful for understanding the embodiment of the present invention. Broadly, FIG. 1 illustrates three stacked communication devices 10, 20, 30 linked by a cascade connection 50 and to which a number of computing devices 40, 42, 44 are connected. Clearly, in a practical implementation there would be many more computing devices connected to the network but these have been omitted for clarity as they are not essential for understanding the present embodiment.

In more detail the stack or cascade illustrated in FIG. 1 comprises three communication devices 10, 20, 30. Each of these has a number of ports 12, 22, 32 to which computing devices forming the network can be connected. Each communications device in the stack also has a cascade port 14, 24, 34 and these ports are connected together by way of cascade connection 50. Each communications device further comprises control means 16, 26, 36 which controls the operation of the overall device according to a defined functionality and also provides known management functions as required.

If the communication devices function as bridges, the control means functions such that any communication received on any one of ports 12 by for example communication device 10, will be retransmitted from cascade port 14 in addition to others of ports 12, if this is necessary to enable the communication to reach its intended destination or destinations. This will mean that the communication in question will reach communication devices 20 and 30 via cascade ports 24 and 34 enabling those communication devices to retransmit the communication via ports 22, 32. If the communication devices are repeaters the control means provides the repeater function in the stack in a corresponding fashion.

In FIG. 1 there are illustrated three computing devices 40, 42 and 44 connected to the stack of communication devices by way of links 41, 43, 45 respectively. It will be seen that each of computing devices 42 and 44 is connected to a single port in the stack by way of simple connections 43, 45. Computing device 40 is connected to the stack of communication devices by way of a trunk 41 comprising two links 41a, 41b connected to port 12a on communication device 10 and port 22c on communication device 20. As mentioned above, this trunking arrangement increases the bandwidth available for communication by computing device 40.

As mentioned above, control means 16, 26, 36 provide some management processing. This, among other functions, monitors which computing devices are attached to which ports. It is possible to do this by monitoring the communications received on each port each of which will specify the source address. If it appears that the same computing device is connected to more than one port on a communication device, a port mismatch error will normally be generated within the control means to indicate that some misconfiguration of the network has occurred. An exception to this is made in the situation where trunking is defined and this is a special arrangement which permits communications to be received from a single computing device on a designated plurality of ports. Such a simple implementation is not possible when a trunk is distributed across stack as illustrated in FIG. 1.

As illustrated, link 41a forming part of trunk 41 is connected to port 12a of box 10. Communications originating at computing device 40 will therefore be seen by control means 16 in box 10 at port 12a and port 12a will be associated with computing device 40. The other link 41b forming part of trunk 41 is connected to port 22c of device 20. These communications may be retransmitted on the cascade 50 via port 24 and therefore received by box 10 at port 14. Control means 16 in box 10 therefore may see communications originating at computing device 40 also at cascade port 14. It is not possible, within control means 16, simply to define the trunk as comprising port 12a and 14 in the same way as would be possible if both links of the trunk were connected to ones of ports 12 on box 10. This is because control means 16 in box 10 will also see on cascade port 14 communications originating at computing device 42 transmitted onto the cascade connection via port 24 and computing device 44 transmitted onto the cascade via port 34. If port 14 was simply designated as part of the trunk this would cause many more port mismatch errors to occur.

In the described embodiment of the present invention this potential for errors is removed by way of sending extra information concerning the packet in question with the packet when it is transmitted by the cascade link 50. As mentioned above, in the present invention, additional data bits may be added to each communications packet which is transmitted via cascade 50 to transmit information to other communication devices in the stack which then remove these additional data bits before retransmission of the packet onto the remainder of the network. This is explained in more detail in the following.

FIG. 2A illustrates the formation of a data packet in accordance with known network protocols such as Ethernet. The packet starts with a preamble (PRE) which carries no information but comprises a number of bits in a predetermined or pseudo random form enabling proper detection of and synchronisation with a packet which is being received. The packet also includes destination address (DA) and source address (SA) fields which identify the intended destination of the packet and its originator, and the data field which carries the actual data conveyed by the data packet. Various well known protocols define the presence of fields additional to those illustrated in FIG. 2A, but these are omitted here as FIG. 2A is simply to illustrate the general format of a data packet. However it should be noted that within a network, all data packets must conform strictly to the pattern defined by the protocol under which the network is working to enable proper functioning of the network.

However, as mentioned above, additional data is added to each packet which is transmitted via a cascade link, and therefore effectively a local variation on the network protocol is established within the cascade connected stack.

In particular, in the present embodiment an extra field (TRU) is added to each communications packet transmitted via the cascade as illustrated in FIG. 2B. This indicates if the packet in question has arrived at the stack on a port which forms part of a trunk connection and, if so, which trunk. As illustrated the TRU field is inserted immediately ahead of the DA field. This is merely by way of example and the TRU field may be inserted at any appropriate position within the data packet. The insertion and removal of the TRU field is controlled by control means 16, 26, 36 which act to insert a TRU field in each packet transmitted via the cascade connection and to read and remove the TRU field from each packet received from the cascade connection. Packets being transmitted within the stack are therefore all of the form illustrated in FIG. 2B, but all packets transmitted to the network via ports 12, 22, 42 are of the form illustrated in FIG. 2A and therefore conform to the general network protocol.

In configuring the stack, control means 16 within box 10 has defined therein the presence of trunk connection 41 to computing device 40 with the information that one of the connections forming this trunk is to port 12a. It in trunk 41 to be received on cascade port 14.

Correspondingly, control means 26 within box 20 has defined therein the presence of trunk connection 41 with the information that one of the connections forming this trunk is to port 22c while additional communications in the trunk may be received via cascade connection 24.

Accordingly, when computing device 40 sends a communication in the form of FIG. 2A via link 41b this is received by box 20 at port 22c. Control means 26 acts to re-transmit the packet in its received form via others of ports 22, and also in the form of FIG. 2B via cascade connection 24. In particular, for re-transmission via cascade connection 24 control means 26 adds a TRU field to the packet identifying the packet as one which is received from trunk 41.

When the modified packet is received at port 14 of box 10, control means 16 reads and removes the TRU field. The removal of the TRU field means that the packet is re-transmitted via ports 12 in its original FIG. 2A format according to the network protocol. Upon reading the TRU field, control means 16 determines that the packet is one which has been received by the stack from trunk 41 and therefore the fact that the SA field identifies the same source as the SA fields in packets received at port 12a is not taken to indicate a port mis-match.

In contrast, when the modified packet mentioned above is received at port 34 of box 34 and control means 36 reads and removes the TRU field, control means 36 determines that it is a packet received via a trunk which is not directly linked to box 30, and therefore the packet, with the TRU field removed, is treated in the usual way.

By way of further contrast, consider a packet received by box 20 from computing device 42 by way of link 43. This packet is in the format of FIG. 2A and is re-transmitted in this form via others of ports 22. However, for transmission via the stack in this embodiment, the packet must have the format of FIG. 2B in order to conform to the local protocol in cascade 50. Control means 26 therefore inserts a TRU field which indicates that the packet was not received via a trunk connection and transmits the modified packet to the cascade 50.

Upon receipt of this modified packet at ports 14 and 34, control means 16 and 36 remove and read the TRU field. There is however no specific action to take as the packet is not from a trunk connection and the packet is re-transmitted in its original FIG. 2A format via ports 12 and 32.

This arrangement is therefore different from the prior art which would simply define cascade port 14 as one of the trunked ports because in that arrangement it would not be possible to receive communications from any other source via cascade port 14. Rather, in the present embodiment, control means 16 in box 10 is aware of the acceptability of receiving communications associated with this trunk via cascade port 14 to avoid generating port mismatch errors on port 12a.

It will be seen that this embodiment provides advantages in terms of enabling implementation of a trunk comprising a number of communication links connected to ports on different boxes in a stack of communication devices which would not be possible in the prior art configuration.

What is claimed is:

1. Communication apparatus for a computer network employing addressed data packets, comprising:

a stack of communication devices, each of which has a multiplicity of ports for forwarding data packets to said computer network and receiving data packets from said computer network;

a cascade connection which includes at least one cascade port of each of said communication devices, said cascade connection providing transmission of data packets from any of the communication devices to any other of the communication devices;

a further communication device which is connected by a plurality of links each extending to a respective port, other than any of said at least one cascade port, of more than one of said communication devices in said stack, said plurality of links constituting a trunk for the sending of addressed data packets via any of said plurality of links; and in each of said plurality of communication devices in said stack, means for transmitting together with each addressed data packet transmitted by said cascade connection an indication whether said each addressed packet has been received at a port connected by one of said plurality of links to said further communication device and for responding to such indications received with addressed data packets from said cascade connection whereby to distinguish between addressed packets received by said respective port from said further communication device by way of said cascade connection.

2. Communication apparatus according to claim 1, wherein said means for transmitting in each of said plurality of communication devices includes means for inserting in each addressed packet received by way of trunk and transmitted by way of the cascade a specific indication identifying said trunk, said indication being constituted by a field in the respective addressed data packet, and means for removing such a field from addressed data packets received from the cascade connection.

3. A communication device capable of operation in a stack of communication devices interconnected by a cascade connection which allows transmission of addressed data packets from each of the communication devices in the stack to any other communication device in the stack, and capable for use in a network wherein a further communication device has a trunk connection with a plurality of communication devices in said stack, said trunk connection comprising a plurality of links each extending from said further communication device to a respective port on each of a plurality of the communication devices in said stack, the plurality of the communication devices including said communication device, wherein said communication device includes:

a plurality of non-cascade ports for transmitting addressed data packets to and/or receiving addressed data packets from a computer network;

at least one cascade port for coupling said communication device to said cascade connection;

means for modifying addressed data packets received at said respective port of said communication device from said further communication device by the insertion of a field which specifically identifies said trunk connection; and means for removing from addressed data packets received by way of said cascade port from said cascade connection any such field.

* * * * *